United States Patent [19]

Johansson et al.

[11] Patent Number: 4,458,779

[45] Date of Patent: Jul. 10, 1984

[54] SILENCER

[75] Inventors: Bengt R. Johansson; Lennart H. Slycke, both of Sollentuna; Göte V. Norrbrand, Kungsängen, all of Sweden

[73] Assignee: Antiphon AB, Sundbyberg, Sweden

[21] Appl. No.: 391,244

[22] Filed: Jun. 23, 1982

[30] Foreign Application Priority Data

Jul. 2, 1981 [SE] Sweden .................. 8104125

[51] Int. Cl.³ .............................. F01M 1/10
[52] U.S. Cl. .................................... 181/252
[58] Field of Search .................. 181/244–246, 181/252, 256, 258

[56] References Cited

U.S. PATENT DOCUMENTS

| 1,909,511 | 5/1933 | Wilson | 181/256 |
| 2,166,417 | 7/1939 | Manning | 181/256 |
| 3,163,256 | 12/1964 | Lanning | 181/244 |
| 3,227,241 | 1/1966 | Mattoon | 181/245 |
| 4,036,324 | 7/1977 | Washbourne | 181/252 |

FOREIGN PATENT DOCUMENTS 217466 12/1967 Sweden .

Primary Examiner—Donald A. Griffin
Assistant Examiner—Brian W. Brown
Attorney, Agent, or Firm—Stevens, Davis, Miller & Mosher

[57] ABSTRACT

A silencer comprising one or more sound-absorbing parts of ceramic material. The ceramic material is porous and the sound-absorbing parts are self-supporting and have a specific resistance to air flow of $10^3$–$10^7$ Pas/m² and a compression strength of at least 40 kN/m², preferably at least 400 kN/m².

15 Claims, 10 Drawing Figures

SILENCER

The present invention relates to a silencer comprising one or more sound-absorbing parts of ceramic material.

In its simplest form, an exhaust silencer comprises solely a so-called reactive part constructed of chambers of different size connected together by means of pipes of varying lengths. The pipes and partitions between the chambers may also be perforated. In this case, the silencer is normally made entirely of sheet metal.

To satisfy demands on lower noise emission, more and more silencers are also provided with a so-called absorption part. Various kinds of fibre material are used in the absorption part, to obtain the desired sound absorption effect.

The fibre material is, however, subjected to severe chemical, thermal and mechanical stresses, due to flowing gases and an increased temperature.

The glass fibre material and mineral fibre material used today in silencers has been found unsuitable because of the rapid wear to which it is subjected and to the chemical decomposition of the material. In the case of fibre-based material, the free or specific surface is extremely large relative to the volume. As a result of this large specific surface area, the material rapidly becomes brittle due to chemical attack, among other things due to the ion exchange which takes place, for example, in glass in an acid environment, and particularly at an elevated temperature. Easily mobile hydrogen ions can replace the alkali and alkali earth ions in the amorphous, non-crystaline structure of the glass. This ion exchange is particularly harmful in the case of small dimensions, such as at mineral fibres and glass fibres. As a result of this reduction in strength, the fibres are disintegrated and accompany the exhaust gases out to the surroundings. This gives a decreased sound absorption in the silencer, resulting in a higher noise level. There is also the additional risk of the fibres carried by the exhaust gases being inhaled by people and animals. The poor chemical and mechanical properties of the fibre materials for this field of application have forced silencer manufacturers to mechanically protect the fibre material. This is often effected with the aid of perforated sheet-metal pipes. These mechanical protecting devices, however, are not able to prevent the fibre material from being broken down in a short period of time and blown out through the exhaust system when used in a perfectly normal manner. Practical tests have shown that the fibre material in a mass-produced private car silencer has disappeared practically completely after 10000 kilometers of driving, which means that for the greater part of its useful life the silencer operates without a sound-absorbing material. The silencer will thus cause more noise to be emitted than was intended when the silencer was constructed. The problem is accentuated still more in those cases where it is desired to construct silencer systems having a long useful life.

Another problem encountered with the pre-compacted fibre materials often used today, is that they obtain felt-like properties and hence water condensing there at unfavourable temperature conditions is readily absorbed. The water often has acid properties. Consequently, both the absorbent and its housing are seriously attacked in this environment.

According to the present invention the above mentioned problems have been solved and a silencer comprising one or more sound-absorbing parts of ceramic material has been brought about.

The silencer is characterized in that the ceramic material is porous and that the sound-absorbing parts are self-supporting and have a specific resistance to air flow of $10^3$–$10^7$ Pas/m$^2$, preferably $10^4$–$10^6$ Pas/m$^2$, and a compression strength of at least 40 kN/m$^2$, preferably at least 400 kN/m$^2$. The specific resistance to air flow mentioned is so high that flowing gases cannot penetrate the parts to any material extent.

The ceramic sound-absorbing material should have a regular pore system with communicating cells. The pores or cells will normally have an average size of 0.05–20 mm, preferably 0.5–5 mm and they must communicate with each other through openings in the cell walls. These openings are often of circular configuration.

The total cell volume (the porosity) of the material is 50–95%, preferably 70–90%. The cell volume and the cell size can be regulated in various ways. For example, a process of fermentation, effected by adding a fermenting agent, can be used. Other conceivable methods are those where gas is blown into the material or where the material is whipped in combination with a foam-forming agent. As will be understood, mechanical agitation can be applied in all cases.

Subsequent to moulding and drying the material, a self-supporting, highly porous ceramic material is obtained.

The dried material is often subjected to a high-temperature treatment process, at a temperature of at least 500° C.

The sound-absorbing parts can also be obtained by sintering ceramic, porous or none-porous, solid materials at a temperature of, for example, 900°–1300° C.

The density of the ceramic material is 100–2500 kg/m$^3$, preferably 200–1650 kg/m$^3$.

The sound-absorbing parts have a bending strength exceeding 10 kN/m$^3$, preferably exceeding 100 kN/m$^3$, and a linear thermal coefficient of expansion of at most $20 \cdot 10^{-6}$ K$^{-1}$.

The silencer according to the invention is intended generally to be used in conjunction with flowing gases.

The sound-absorbing parts can be shaped in different ways. Thus, they can be provided with one or more through-going holes for passage of flowing gases. For example, the holes can have a diameter of 5–300 mm, usually 10–200 mm. However, the holes can also be considerably larger.

The sound-absorbing parts can also have such a shape and be installed inside the silencer in such a manner that flowing gases pass along the outside of the parts.

Usually, the sound-absorbing parts make inserts in a silencer of sheet metal.

The silencer is particularly suited for combustion engines. Practical tests have namely shown that the above ceramic material resists the thermal, mechanical and chemical stresses it is subjected to when it is incorporated in a silencer for combustion engines. For example, the ceramic, porous material incorporated in a private car silencer is practically unaffected after 10000 kilometers of driving.

The regular pore system of the material also serves as a drain for any exhaust condensate present. This also reduces the risk of corrosion in the silencer.

The thermal, mechanical and chemical strength properties of the material obviate in the silencer the need for protective devices or supports, for example, in the form of perforated pipes or the like between the exhaust flow and the material.

In contrast to fibre material, it has also been found possible to use highly porous ceramic materials as self-supporting construction materials for the purpose of increasing the sound absorption in different types of silencers. This gives far greater freedom and more possibilities of variation in the construction of silencers than is the case when using the fibre material of today. The properties of the highly porous ceramic material are generally so good as to enable the silencer to be placed close to the engine (the sound source). As mentioned above, the ceramic material has been found to have a very high strength at the use in silencers.

Should, however, any part of the sound-absorbing material accompany the flow of exhaust gases, the outer environment, including people and animals, will not be affected. This depends on the fact that the material is not fibrous. Furthermore, the composition of the material can be compared with natural minerals.

The invention will now be described in more detail with reference to the following embodiment examples and accompanying figures, of which FIG. 1 illustrates curves showing how the sound-absorption coefficient $\alpha$ varies with the frequency of the air sound at two different ceramic materials used in accordance with the invention.

EXAMPLE 1

Figure 1:
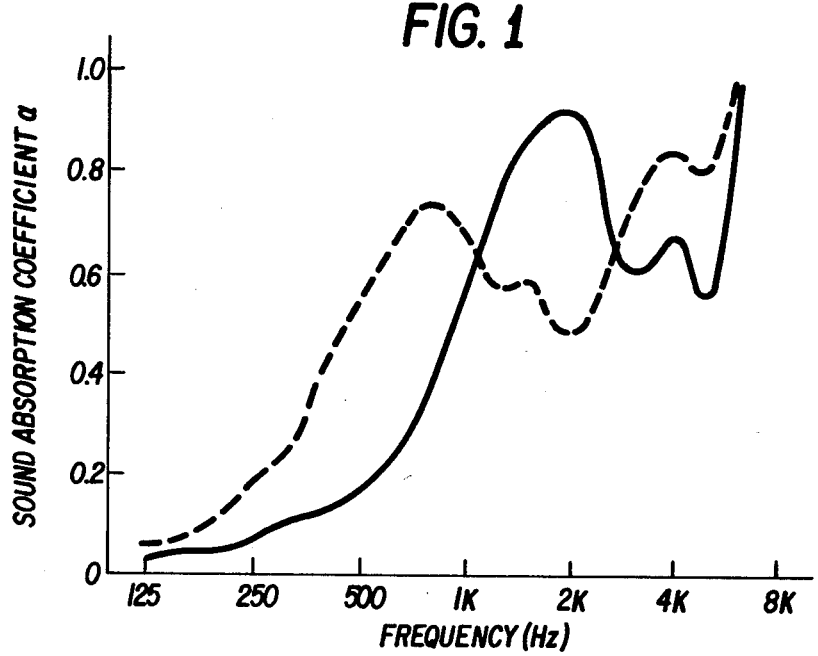

A plate of foamed, ceramic material having a thickness of 30 mm and a specific resistance to air flow of $3 \cdot 10^4$ Pas/m$^2$ and a density of 520 kg/m$^3$ was mounted against a sound-reflecting surface and the air-sound absorption was measured. The result is shown by the full-lined curve in FIG. 1.

EXAMPLE 2

A sheet of foamed-ceramic material having a thickness of 30 mm and a specific resistance to air flow of $1.9 \cdot 10^5$ Pas/m$^2$ and a density of 340 kg/m$^3$ was mounted against a sound-reflecting surface and the air-sound absorption was measured. The result is shown by the broken curve in FIG. 1.

EXAMPLE 3

Figure 2:
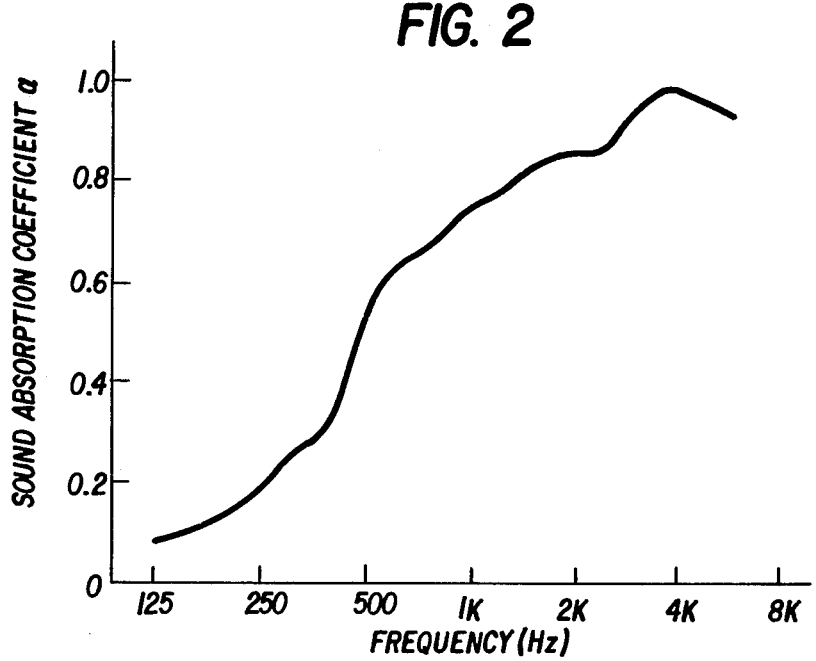
FIG. 2 is a comparison curve showing how the sound-absorption coefficient $\alpha$ varies with the air-sound frequency in a sheet of mineral wool.
Figure 4:
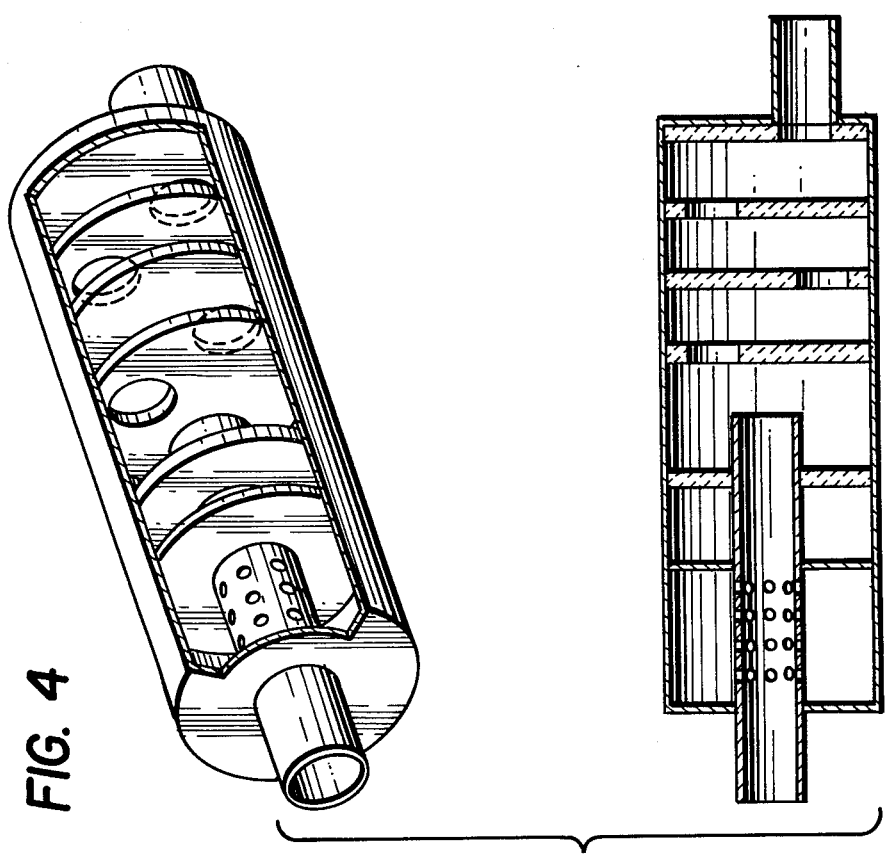
FIGS. 3, 4, 5, 6, 9 and 10 illustrate different embodiments of a silencer according to the invention.

A sheet of mineral wool 30 mm thick and having a specific resistance to air flow of $6.7 \cdot 10^4$ Pas/m$^2$ and a density of 140 kg/m$^3$ was mounted against a sound-reflecting surface and the air-sound absorption was measured. The result is shown in FIG. 2.

EXAMPLE 4

Figure 3:
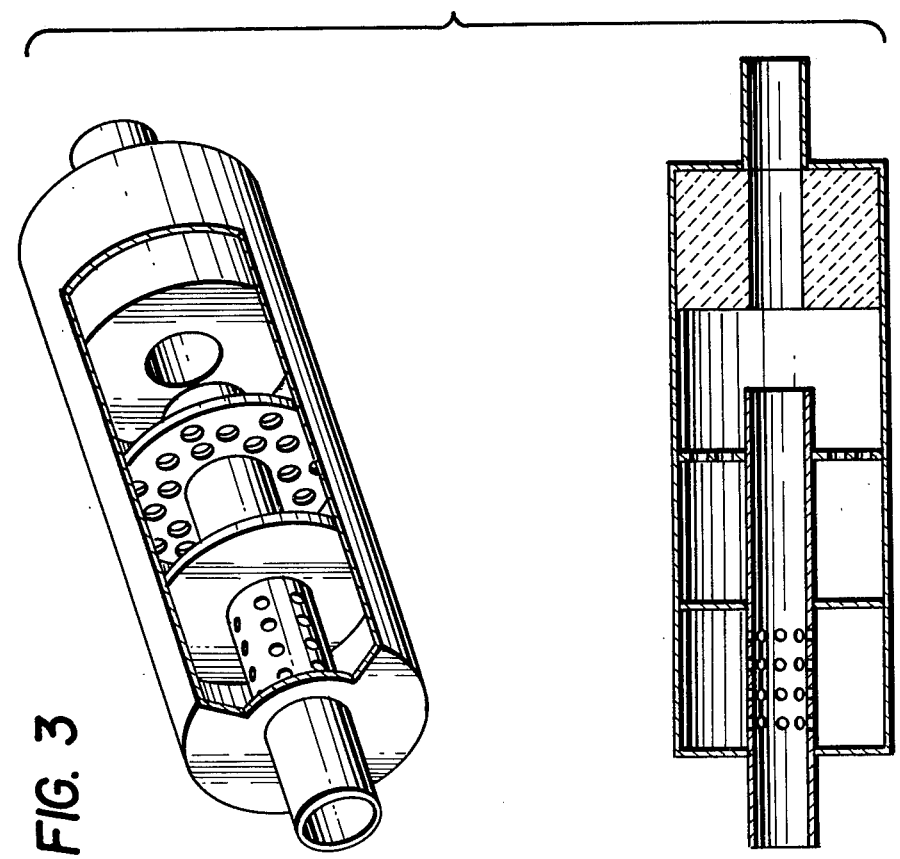
Figure 6:
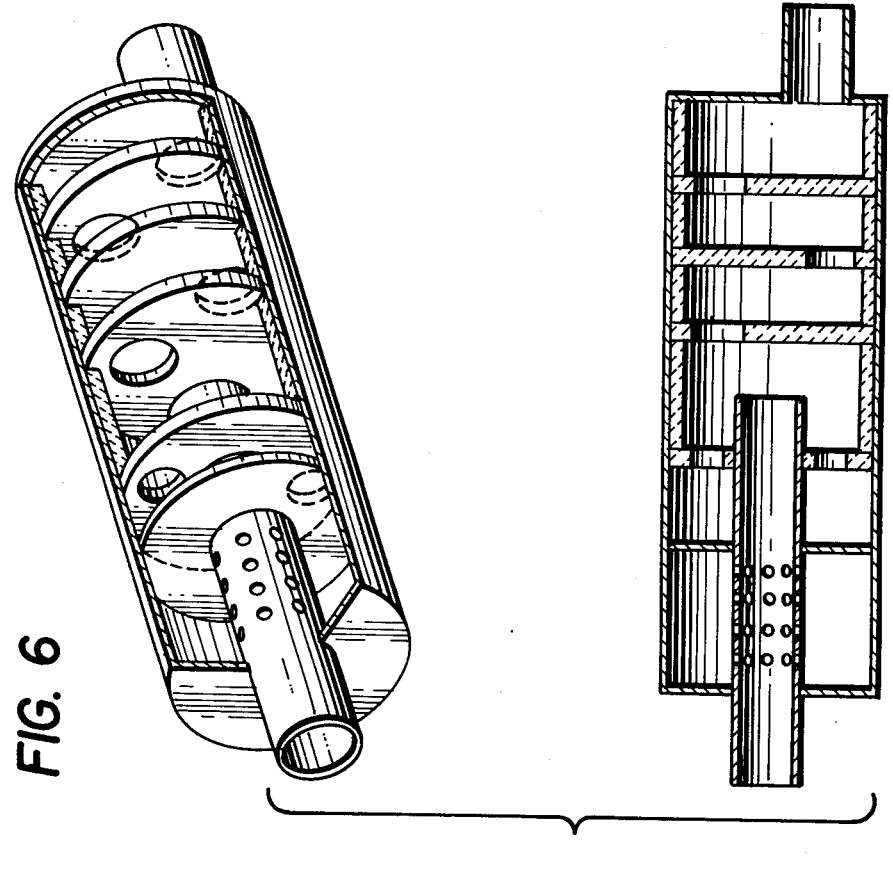
Figure 5:
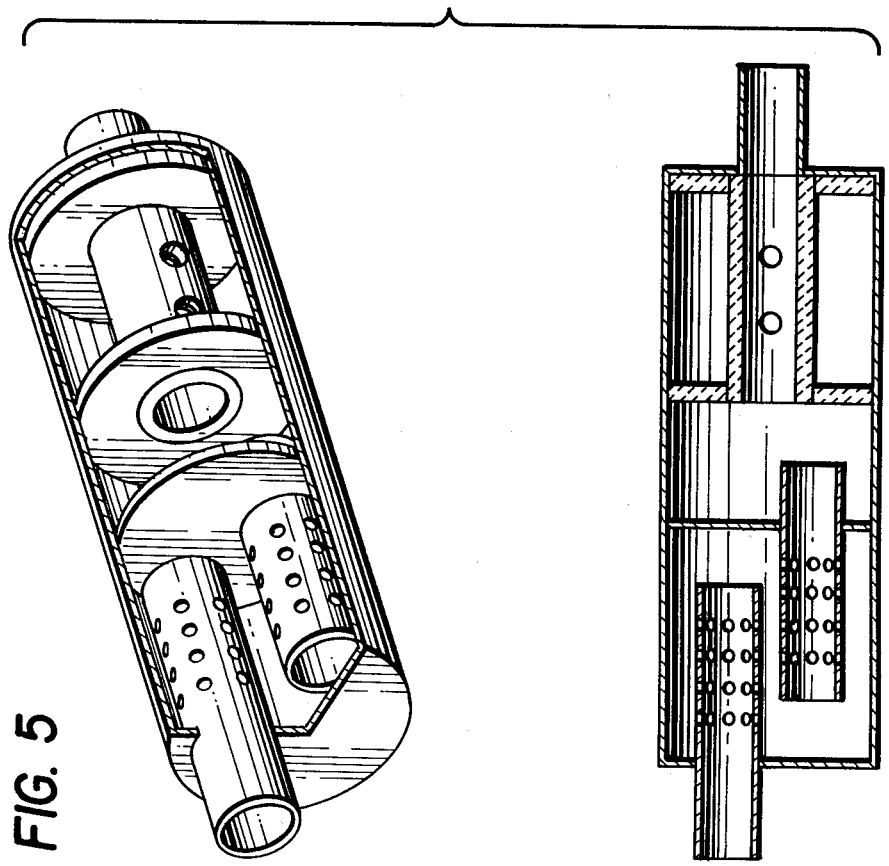
Figure 9:
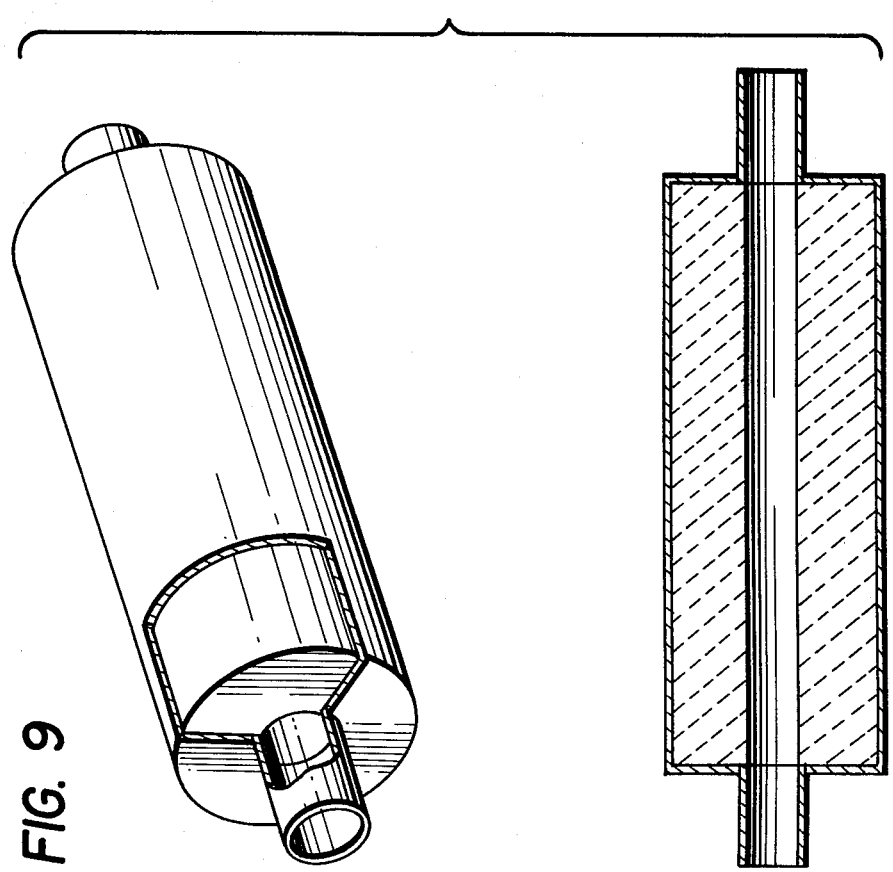

The porous, ceramic material can have the same shape as conventional fibre material when used in a silencer. FIGS. 3 and 9 illustrate such designs. In contrast to fibre materials, the ceramic material, however, need not be protected by cover plates and perforated metal pipes.

EXAMPLE 5

Because of its mechanical strength, the ceramic material enables silencers to be constructed to completely different designs than could be achieved when using conventional fibre materials. FIGS. 4, 5, 6 and 10 illustrate a number of such embodiments.

EXAMPLE 6

A cellular, ceramic material according to the invention was subjected to a leaching test in artificial exhaust gas condensate. The leaching solution used had the following composition:

| | | |
|---|---|---|
| $PbCl_2$ | 328 mg/l | |
| $CuCl_2 \cdot 2H_2O$ | 2.95 mg/l | in distilled water |
| $FeCl_3 \cdot 6H_2O$ | 9.2 mg/l | |
| $NH_4Cl$ | 153 mg/l | |

Figure 7:
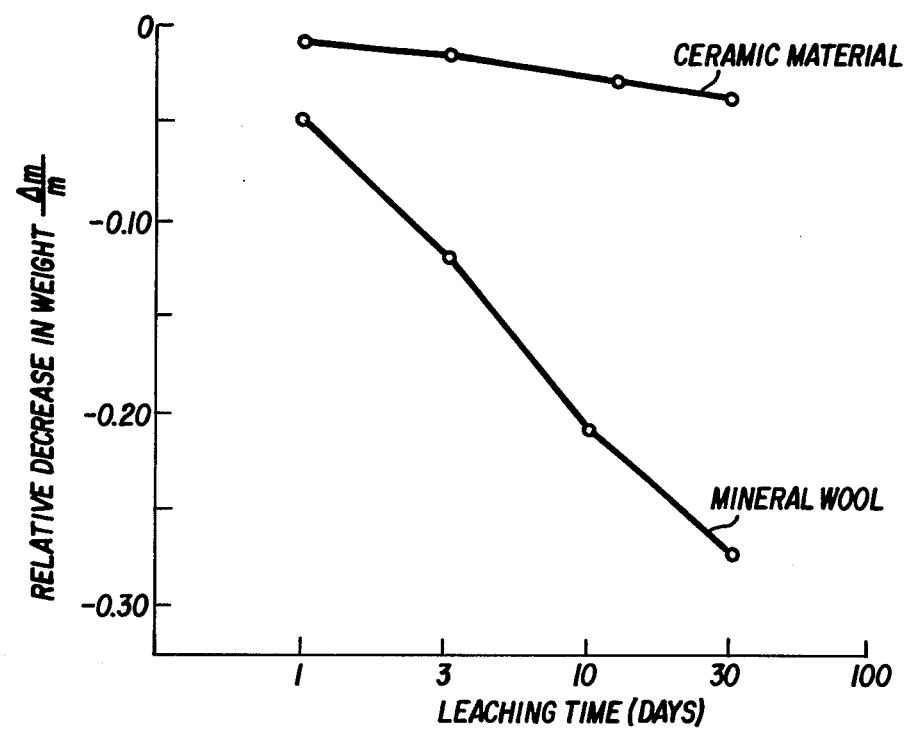
FIG. 7 illustrates curves showing the results of leaching tests on a ceramic material according to the invention and on a comparison test using mineral wool respectively.

The pH was adjusted to 2.3 with HCL each day during the test. Each of 3 sample bodies having a volume of about 20 cm$^3$ was placed in 2 liters of the solution and stored in a heating chamber at a temperature of $+90°$ C. Prior to being placed in the solution, the samples were weighed, washed and dried and then weighed again after 1, 3, 10 and 30 days. The average value of the change in weight of the sample bodies is shown in FIG. 7 as the relative weight decrease relative to the leaching time, in a logarithmic scale.

EXAMPLE 7

The test according to Example 6 was repeated with mineral wool. The result is shown in FIG. 7.

EXAMPLE 8

Figure 8:
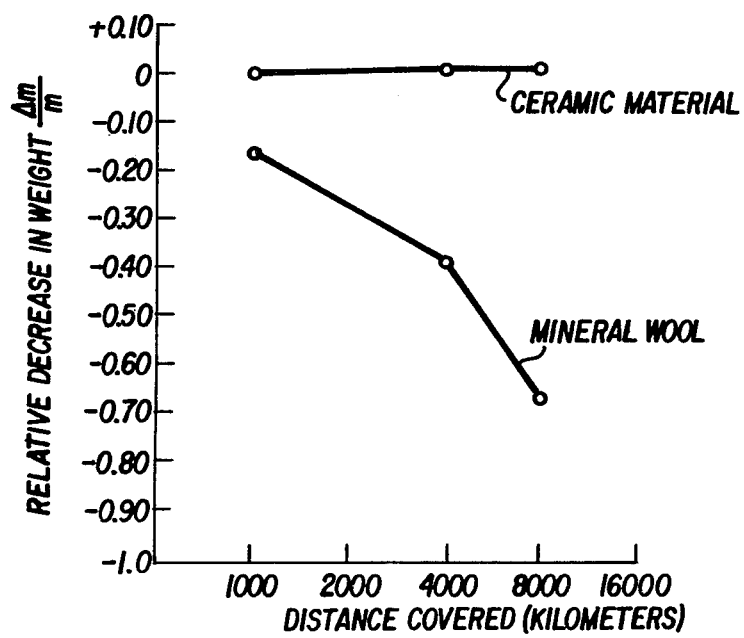
FIG. 8 shows, finally, curves illustrative of the reduction in weight of a ceramic silencer insert according to the invention and a known mineral wool respectively in relation to the number of kilometers driven in a car in which the silencer was mounted.
Figure 10:
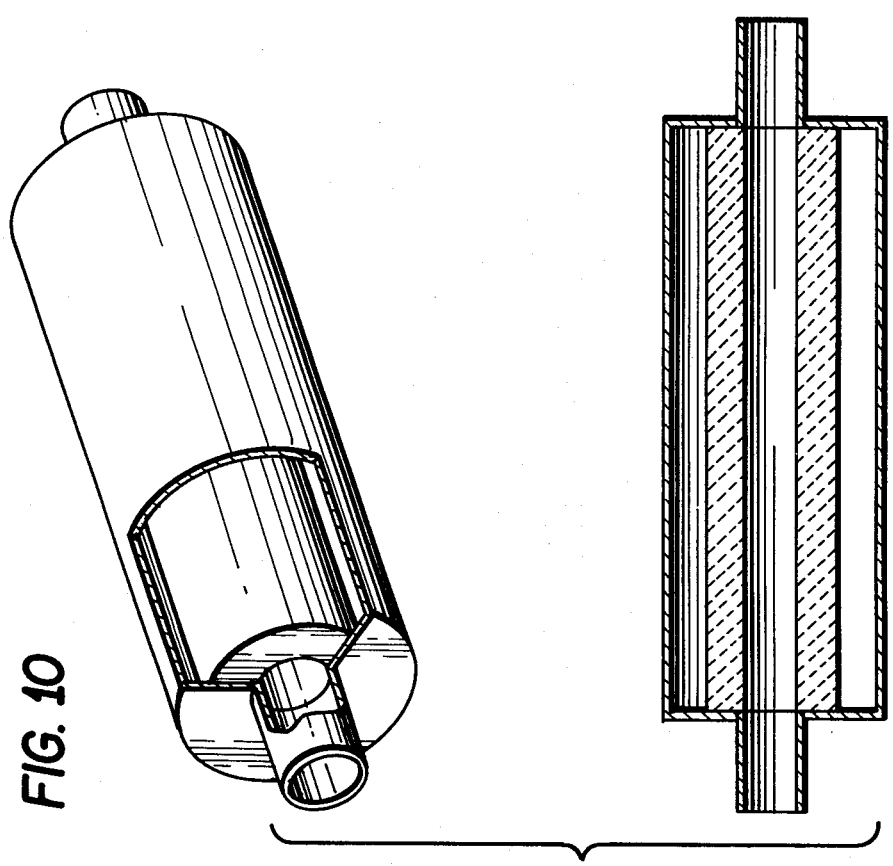

A sound-absorbing insert was manufactured from a cellular ceramic material and mounted in a silencer intended for a petrol driven private car. The insert was weighed before it was mounted in the silencer and when the car had been driven 1000, 4000 and 8000 kilometers respectively. The result is shown in FIG. 8 as the relative change in weight relative to the distance covered.

EXAMPLE 9

A sound-absorbing insert made of mineral wool was mounted in a silencer intended for a petrol driven private car.

The mineral wool was protected against the flow of exhaust gases by a perforated sheet metal pipe. The insert was weighed before it was mounted in the silencer and again when the car had been driven 1000, 4000 and 8000 kilometers respectively. The result is shown in FIG. 8 as the relative change in weight relative to the distance covered.

The invention is not limited to the embodiments shown, since these can be modified in different ways within the scope of the present invention.

We claim:

1. A silencer comprising one or more sound-absorbing parts made of ceramic material, characterized in that the ceramic material is porous with communicating pores, that the sound-absorbing parts have been subjected to a high-temperature treatment process at a temperature of at least 500° C., that the parts are self-supporting and have a specific resistance to air flow of $10^3$–$10^7$ Pas/m$^2$, preferably $10^4$–$10^6$ Pas/m$^2$, which is so high that flowing gases cannot penetrate the parts to any material extent, and a compression strength of at least 40 kN/m$^2$, preferably at least 400 kN/m$^2$.

2. A silencer according to claim 1, characterized in that the pores in the ceramic material have an average size of 0.05–20 mm, preferably 0.5–5 mm.

3. A silencer according to claim 1, characterized in that the total porosity of the ceramic material is 50–95%, preferably 70–90%.

4. A silencer according to claim 1, characterized in that the ceramic material has a density of 100–2500 kg/m$^3$, preferably 200–1650 kg/m$^3$.

5. A silencer according to claim 1, characterized in that the porous ceramic material is cellular.

6. A silencer according to claim 5, characterized in that the ceramic cellular material is foamed by subjecting the same to a fermenting process.

7. A silencer according to claim 5, characterized in that the ceramic cellular material is foamed by agitation.

8. A silencer according to claim 5, characterized in that the ceramic cellular material is foamed by injecting gas thereinto.

9. A silencer according to claim 1, characterized in that the sound-absorbing porous parts are obtained by sintering a ceramic, porous or non-porous, solid material.

10. A silencer according to claim 1, characterized in that the sound-absorbing parts have a bending resistance exceeding 10 kN/m$^2$, preferably exceeding 100 kN/m$^2$.

11. A silencer according to claim 1, characterized in that the sound-absorbing parts have a linear coefficient of thermal expansion of at most $20 \cdot 10^{-6}$ K$^{-1}$.

12. A silencer according to claims 1, characterized in that said silencer is intended for combustion engines.

13. A silencer according to claim 1, characterized in that the sound-absorbing parts are provided with one or more through-going holes for passage of flowing gases.

14. A silencer according to claim 1, characterized in that the sound-absorbing parts have such a shape and are installed inside the silencer in such a manner that flowing gases pass along the outside of the parts.

15. A silencer according to claim 1, characterized in that the sound-absorbing parts make inserts in a silencer of sheet metal.

* * * * *